Patented Apr. 13, 1948

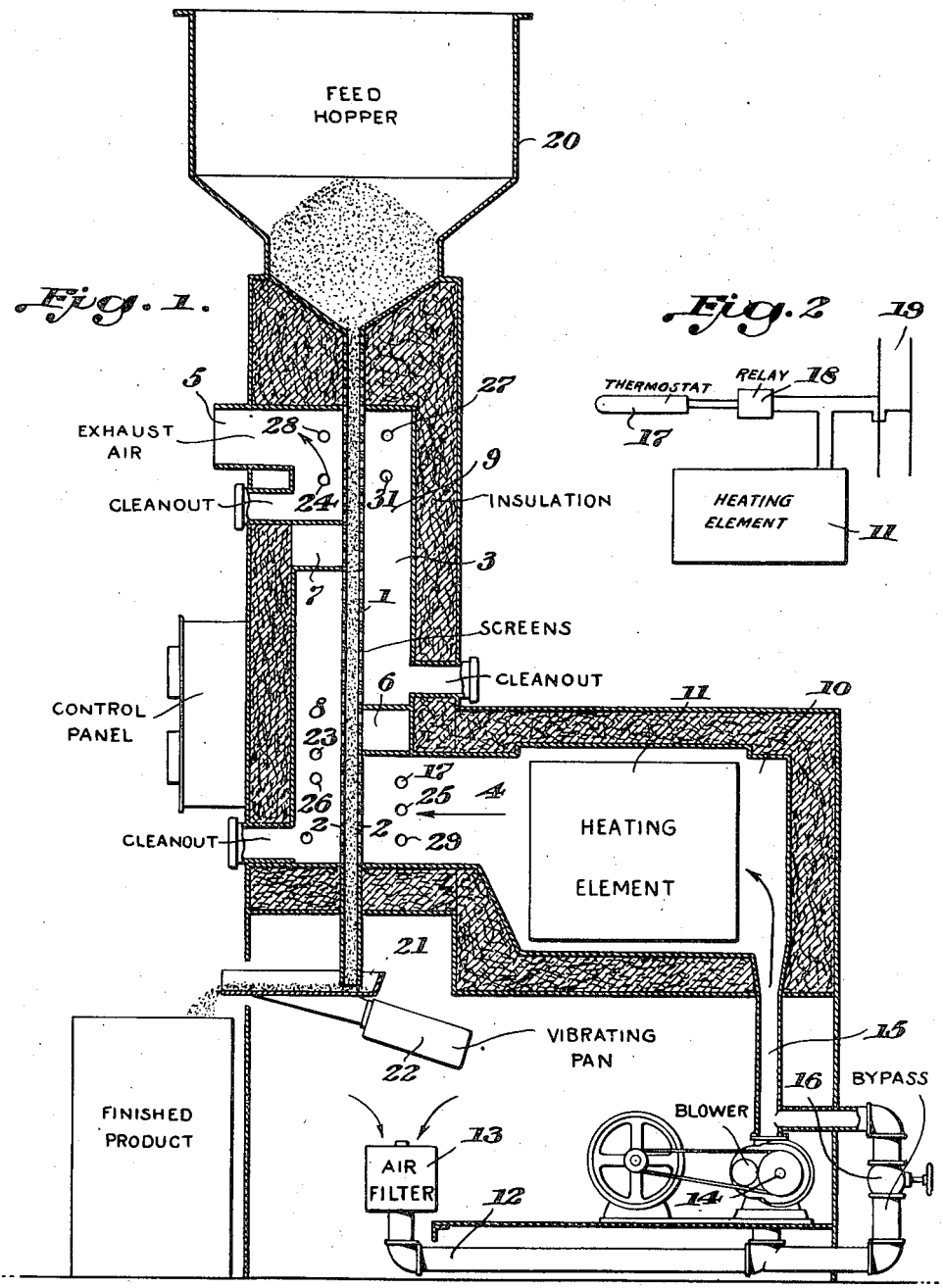

2,439,741

UNITED STATES PATENT OFFICE 2,439,741

PROCESS FOR CONTROLLING DRIER DISCHARGE

Frederick Lucas Litty, Jr., Baltimore, Md., assignor to The Davison Chemical Corporation, Baltimore, Md.

Application April 28, 1943, Serial No. 484,930

2 Claims. (Cl. 34—25)

This invention relates to the activation of silica and other oxide gels and more particularly has reference to a method for the continuous activation of a gel.

Heretofore the activation of granular silica and other oxide gel was effected by placing the material in trays which were subsequently placed in electric ovens and heated for extended periods of time ranging from 4 to 5 hours. These methods necessarily required considerable handling of the gel and at most resulted in an intermittent process with its attendant disadvantages.

An object of this invention is to provide a method for activating silica and other oxide gels in a manner which will avoid the disadvantages of the prior art.

Another object of this invention is to provide a method for continuously activating oxide gels.

Still another object of this invention is to effect the activation of oxide gels by passing a dehydrating gas through a thin stream of the gel.

A further object of this invention is to pass a thin stream of gel to be activated through a channel, pass a dehydrating gas transversely through the channel containing the gel and controlling the rate of flow of the gel through the channel in relation to the temperature of the gas after passing through the gel.

With these and other objects in view, the present invention comprises the steps and procedures hereinafter set forth and indicated in the accompanying drawings.

In the drawings:

Figure 1 is a somewhat diagrammatic vertical sectional view of an apparatus in which the process of the present invention may be carried out.

Figure 2 is a detailed schematic view of the heat control circuits.

Figure 3 is a schematic view of the vibrating pan control circuit.

In carrying out the present invention, a stream of the gel to be activated is passed downwardly through a vertical channel while a dehydrating activating gas is passed transversely through one or more portions of the stream. It has been found that an apparatus such as illustrated more or less diagrammatically in Figure 1 of the drawings is useful in the carrying out of the process in accordance with the present invention. This apparatus is comprised of a channel 1 which is formed by a pair of closely spaced foraminous plates or screens 2. These screens are of such a width and so spaced that a channel of long narrow cross section is provided between the same. The channel 1 is positioned substantially vertically within and extends through a chamber 3, through which heated air or other gas flows. As a matter of fact, the screens 2 forming the channel 1 serve as a partition dividing the chamber 3 into two substantially vertically extending compartments 8 and 9.

Chamber 3 is provided with an inlet 4 for the supply of a heated dehydrating activating gas and with an outlet 5 for the discharge of the gas after having been passed in contact with the gel to be activated. In order to effect an efficient multi-pass flow of the activating gas through the gel contained between the screens 2, a baffle 6 is positioned in compartment 9 and a second baffle 7 is positioned in the other compartment 8 of chamber 3. The baffles 6 and 7 are staggered so that the flow of the gas from the inlet 4 will pass immediately through the lower portion of the channel 1 and be received in compartment 8. The gas will then flow upwardly through compartment 8, then transversely through an intermediate portion of the channel 1 into compartment 9 above baffle 6. The gas upon reaching the upper portion of compartment 9 will flow upwardly and thence transversely through the upper portion of the channel 1 into the portion of compartment 8 above the baffle 7 from which the gas is discharged through the outlet 5.

Compartment 9 of chamber 3 communicates at its lower inlet end 4 with a heating chamber 10 which contains a heating element 11. This heating element may be an electric heating unit or any other type of heating device which will suffice for the heating of air or other gas which flows through chamber 10 to the inlet 4.

Air or other suitable gas is drawn into a conduit 12 through a filter 13 and forced by a blower 14 through a conduit 15 into the chamber 10. A by-pass connecting the intake conduit 12 and the discharge conduit 15 of the blower is provided with a valve 16 by means of which the flow of air or the pressure of air introduced into the chamber 10 can be regulated. The walls of the heating chamber 10 and of the chamber 3 through which the channel 1 extends are of double thickness as illustrated in the drawings with insulating material positioned between the double walls. This serves to minimize the heat losses from the apparatus.

At the bottom of the compartment 8 and directly above the baffles 6 and 7, there are provided clean-out openings from which any accumulation of finely divided gel can be removed to provide for a free flow of the activating gas through the stream of gel contained in the channel 1.

The heating element is preferably thermostatically controlled by a thermostat 17 which in the case of an electric heating element may be incorporated in a circuit such as diagrammatically illustrated in Figure 2 of the drawings. In the case of an electric heating element, the thermostat 17 controls a relay 18 which in turn regulates the supply of current from the supply line 19 to the heating element 11. If a steam heating element is employed, the thermostat would control the operation of an electrically actuated steam regulating valve. Thus, regardless of the type of heating element used, thermostat 17 positioned at the inlet 4 serves to insure a supply of activating gas at a predetermined temperature for effecting the activation of the gel.

The gel to be activated is supplied to the channel 1 by a feed hopper 20 which communicates with the upper end of the channel 1. Flow of the gel through the channel 1 is controlled by a vibrating pan apparatus which comprises a pan 21 positioned directly beneath the discharge end of the channel 1. This pan is positioned close enough to the lower end of the channel 1 to permit the discharge of a given amount of material from the channel after which the discharge will be stopped until the material collected in the pan 21 is removed therefrom. By constantly vibrating the pan 21, the gel will be discharged from the pan as illustrated in Figure 1 of the drawings at a rate depending upon the amplitude and/or frequency of the vibrations imparted to the pan. Obviously, the rate of discharge from the lower end of the channel 1 will be equal to the rate of discharge from the pan 21.

An electrically controlled vibrator is associated with the pan 21 and as illustrated in Figure 3 of the drawings the electrical control means 22 for the vibrating pan is associated with thermostats 23 and 24, either or both of which control the operation of the vibrating pan to regulate the rate of discharge of the gel therefrom. Thermostat 23 is positioned in compartment 8 below the baffle 7 and thermostat 24 is positioned in the upper portion of compartment 8 near the outlet 5. With this arrangement the rate of flow of the gel to be activated through the channel 1 is controlled at such a rate that the temperature of the activating gas will be sufficiently high throughout its travel in contact with the gel to insure an effective activation of the gel.

In addition to the thermostats 17, 23 and 24, temperature indicating elements 25, 26, 27 and 28 are positioned as illustrated in Figure 1 throughout the flow path of the activating gas to indicate the temperature of the gas at its various stages throughout its flow path.

A plurality of pressure responsive devices 29, 30 and 31 may also be positioned at different stages throughout the flow path of the activating gas to indicate the various pressures of the gas at these stages.

It has been found that by activating a gel in accordance with the present invention and controlling the heating of the activating gas to supply gas at a substantially constant temperature and by controlling the flow of the gel to be activated through the channel in accordance with the temperature of the gas after having passed in contact with the gel, an effective activation of the gel can be obtained.

From the foregoing description, it will be appreciated that the present invention provides a continuous method of activating an inorganic gel which, due to the automatic control of the temperature of the activating gas and the rate of feed of the gel in contact with the gas, will insure the production of a product of uniform quality.

I claim:

1. A method of activating an oxide gel comprising passing the gel in the form of granules downwardly in a thin, substantially vertical stream and passing a drying gas at an elevated temperature transversely through a lower portion of said stream, passing the gas transversely through a higher portion of said stream, and controlling the flow of gel downwardly through the channel in relation to the temperature of the drying gas after passing through the higher portion of the stream.

2. A method of activating an oxide gel comprising passing the gel in the form of granules downwardly in a thin, substantially vertical stream and passing a drying gas at an elevated temperature transversely through a lower portion of said stream, passing the gas transversely through a higher portion of said stream, and controlling the flow of gel downwardly through the channel in relation to the temperature of the drying gas after each pass through the gel stream.

FREDERICK LUCAS LITTY, Jr.

REFERENCES CITED

The following references are of record in the file of this patent:

UNITED STATES PATENTS

| Number | Name | Date |
|---|---|---|
| 844,252 | Cordero | Feb. 12, 1907 |
| 1,359,301 | Wettig | Nov. 16, 1920 |
| 1,482,812 | Roberts | Feb. 5, 1924 |
| 1,716,876 | Chamberlain | June 11, 1929 |
| 1,787,878 | Warden-Stevens | Jan. 6, 1931 |
| 1,798,307 | Cooper | Mar. 31, 1931 |
| 1,863,803 | Pantenburg | June 21, 1932 |
| 1,995,293 | Clark | Mar. 26, 1935 |
| 2,037,809 | MacMullin | Apr. 21, 1936 |
| 2,068,574 | Smith | Jan. 19, 1937 |
| 2,150,445 | Jennings et al. | Mar. 14, 1939 |
| 2,317,379 | Hemminger | Apr. 27, 1943 |

FOREIGN PATENTS

| Number | Country | Date |
|---|---|---|
| 68,686 | Sweden | Jan. 7, 1930 |
| 88,011 | Germany | Aug. 10, 1896 |